United States Patent
Acef et al.

(10) Patent No.: US 9,690,165 B2
(45) Date of Patent: Jun. 27, 2017

(54) GENERATOR OF AT LEAST THREE COHERENT LASER BEAMS IN THE INFRARED AND VISIBLE DOMAIN

(71) Applicant: Centre National de la Recherche Scientifique-CNRS, Paris (FR)

(72) Inventors: Mohand Ouali Acef, Paris (FR); Frédéric Du Burck, Nogent sur Oise (FR); Noël Dimarcq, Etampes (FR)

(73) Assignees: CENTRE NATIONAL DE LA RECHERCHE SCIENTIFIQUE-CNRS, Paris (FR); Observatoire De Paris, Paris (FR)

( * ) Notice: Subject to any disclaimer, the term of this patent is extended or adjusted under 35 U.S.C. 154(b) by 0 days.

(21) Appl. No.: 14/785,529

(22) PCT Filed: Apr. 15, 2014

(86) PCT No.: PCT/EP2014/057633
§ 371 (c)(1),
(2) Date: Oct. 19, 2015

(87) PCT Pub. No.: WO2014/170331
PCT Pub. Date: Oct. 23, 2014

(65) Prior Publication Data
US 2016/0124286 A1   May 5, 2016

(30) Foreign Application Priority Data
Apr. 19, 2013  (FR) ..................... 13 00934

(51) Int. Cl.
*G02F 1/35* (2006.01)
*G02F 1/377* (2006.01)
(Continued)

(52) U.S. Cl.
CPC .......... *G02F 1/3532* (2013.01); *G02F 1/3534* (2013.01); *G02F 1/3551* (2013.01);
(Continued)

(58) Field of Classification Search
None
See application file for complete search history.

(56) References Cited

U.S. PATENT DOCUMENTS

| 7,489,437 B1 | 2/2009 | Bauco |
| 2006/0198402 A1 | 9/2006 | Hodgson et al. |

(Continued)

OTHER PUBLICATIONS

International Search Report issued in corresponding application No. PCT/EP2014/057633 mailed Jun. 3, 2014 (3 pages).
(Continued)

*Primary Examiner* — Hemang Sanghavi
(74) *Attorney, Agent, or Firm* — Osha Liang LLP

(57) ABSTRACT

According to a first aspect, the invention relates to a generator of at least three coherent laser beams at least one beam of which is in the infrared domain and at least one beam of which is in the visible domain, comprising: an elementary source for emitting a first continuous-wave laser beam, at a first given infrared wavelength; a nonlinear crystal frequency doubler, allowing, from a first beam sampled from the first laser beam at the first wavelength, a second laser beam to be generated at a second wavelength; and a nonlinear crystal sum frequency generator, allowing, from a second beam sampled from the first laser beam at the first wavelength and from the second laser beam at the second wavelength, a third laser beam to be generated at a third wavelength.

15 Claims, 9 Drawing Sheets

(51) Int. Cl.
*G02F 1/355* (2006.01)
*G02F 1/37* (2006.01)

(52) U.S. Cl.
CPC ................ *G02F 1/37* (2013.01); *G02F 1/377* (2013.01); *G02F 2001/354* (2013.01); *G02F 2001/3507* (2013.01)

(56) References Cited

U.S. PATENT DOCUMENTS

| | | |
|---|---|---|
| 2008/0240177 A1 | 10/2008 | Karlsson et al. |
| 2008/0285606 A1 | 11/2008 | Kippenberg et al. |
| 2009/0185583 A1* | 7/2009 | Kuksenkov ........... G02F 1/3532 372/5 |
| 2010/0150183 A1 | 6/2010 | Starodoumov et al. |
| 2012/0292531 A1* | 11/2012 | Grudinin ............ G01N 21/6458 250/459.1 |

OTHER PUBLICATIONS

French Search Report issued in corresponding priority application No. FR1300934 dated Dec. 9, 2013 (2 pages).
B. Argence et al., "Molecular laser stabilization at low frequencies for the LISA mission"; Physical Review D, vol. 81, pp. 082002-1-082002-8, The American Physical Society, Apr. 2010 (8 pages).
International Preliminary Report on Patentability issued in corresponding application No. PCT/EP2014/057633 dated Jul. 13, 2015 (20 pages).

* cited by examiner

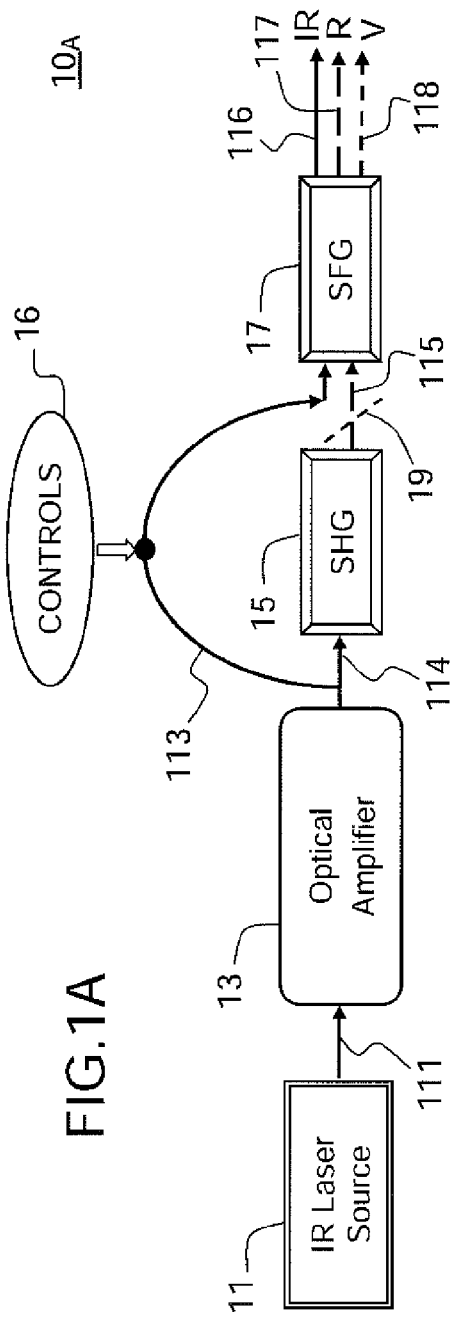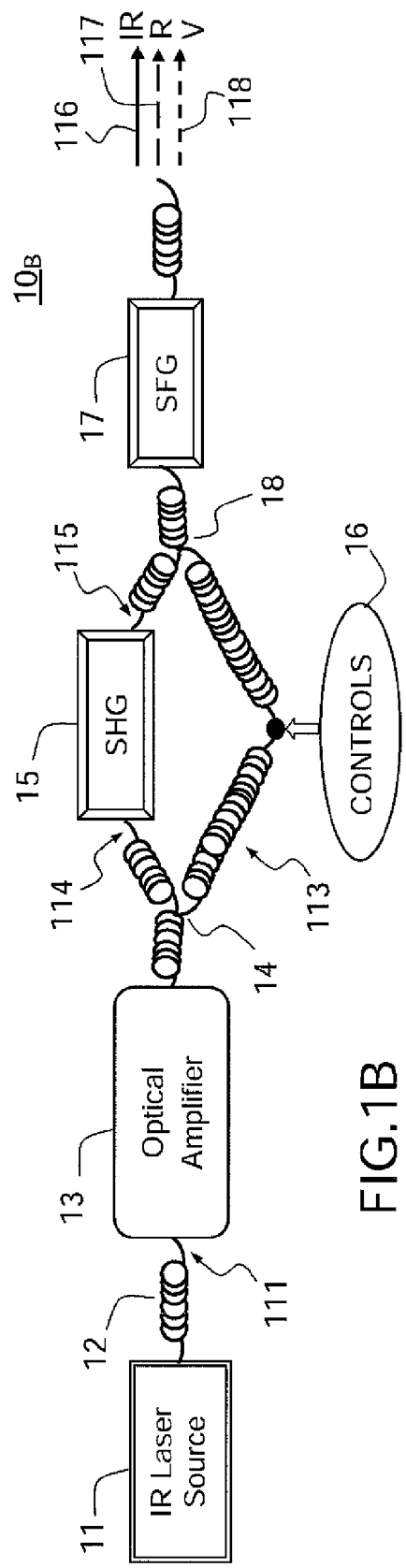

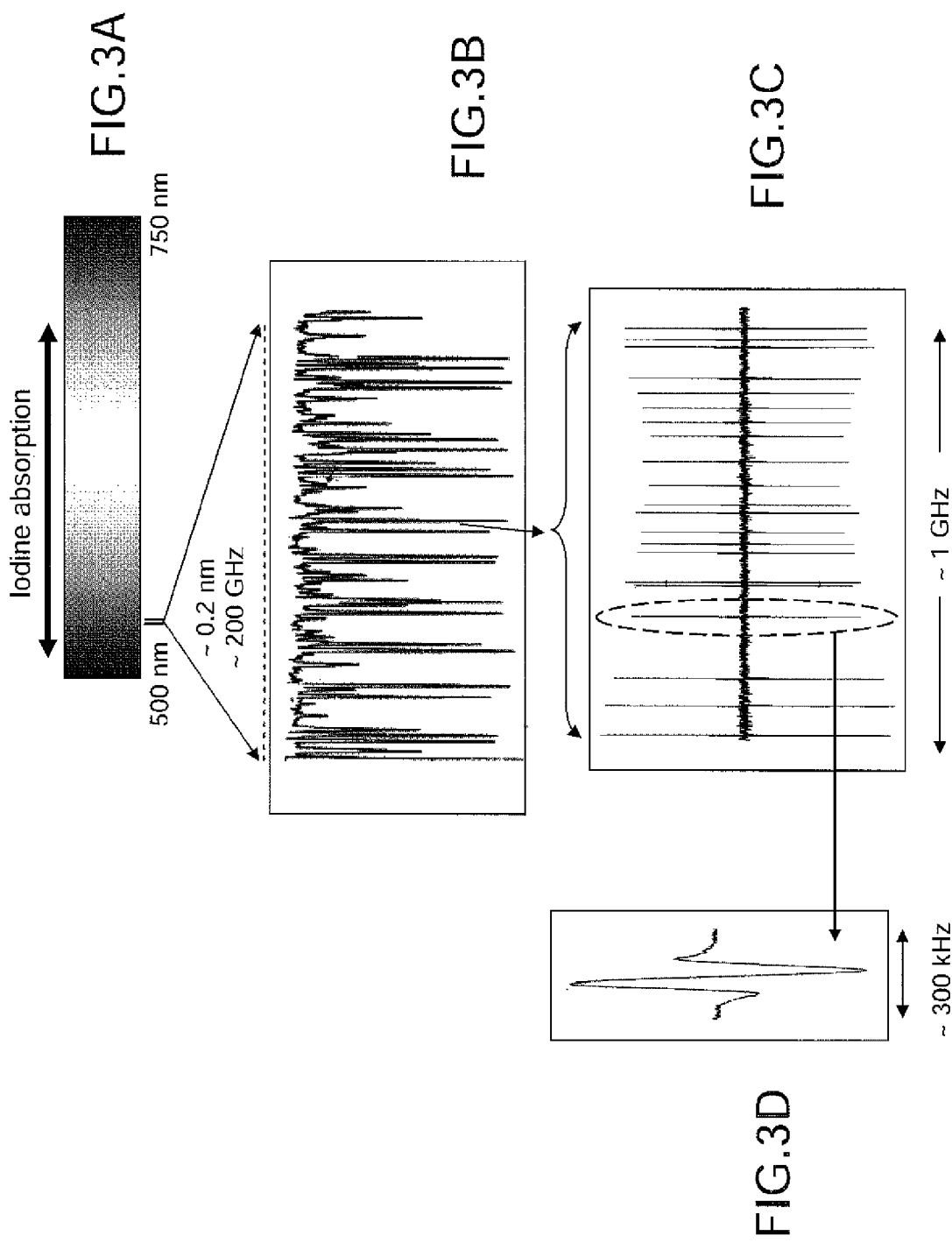

GENERATOR OF AT LEAST THREE COHERENT LASER BEAMS IN THE INFRARED AND VISIBLE DOMAIN

PRIOR ART

Technical Field of the Invention

The present invention relates to a generator of infrared and visible coherent laser beams with high power and a process for generating such beams. It applies especially to the generation of optical beams for laser telemetry and for optical telecommunications.

Prior Art

The ceaseless growth in the volume of communications and transfer of information by optical fibers (increase of more than 70% per year over the last 30 years), requires the setting up of ever more numerous dedicated channels in the vicinity of 1.5 µm. The conventional C band (which covers the 1530 nm-1565 nm domain) is mainly used on account of the low absorption exhibited by single-mode silica optical fibers in this spectral region.

The communications channels fixed by international regulation and used for optical communications are separated by spectral widths which have not ceased to decrease over the last 30 years. At the start of the 90 s, use was made of barely a few coupled wavelengths at the same time in one and the same optical fiber with commercial systems of CDWM (Coarse Wavelength-Division Multiplexing) type. The channels used were separated by of the order of 20 nm. The exponential increase in the volumes of information transferred by way of optical fibers has led to the distances separating the channels used being reduced ever more, so as to increase their number. One speaks today of DWDM (Dense Wavelength-division Multiplexing) systems which use spacings between the channels, wherein the wavelengths propagate, which range from 0.8 nm (100 GHz) to 0.1 nm (12.5 GHz), making it possible to combine nearly 160 optical wavelengths in one and the same communication channel (ITU-T standards G.692 & G 694.1). In parallel, one already speaks of "Ultra DWDM" systems of tomorrow, with several hundred wavelengths usable at the same time, in one and the same channel.

The increasing of the number of communications channels rests upon two strategies. A first strategy is the extension to other spectral regions, and therefore the development of new technological tools (doped optical fibers, optical amplifiers, etc.). This approach involves at one and the same time a high cost and a necessity to amplify the signals more often in the course of a very long distance communication, on account of the considerable absorption of the optical fibers outside of the C band. A second strategy is the more considerable shrinking of the spacings between the channels used in the C band. To avoid an overlap (jamming) of the channels, it is sought to use infrared (IR) lasers whose frequency stability (short and long term) is increased in a significant manner, thus making it possible to scale down the data transfer channels.

Lasers emitting in the C band of the telecommunications domain in the continuous regime (CW mode), possess a high intrinsic spectral purity. To increase the short- and/or long-term frequency stability, and thus increase the coherence length, it is necessary to use an "exterior" frequency discriminant which will make it possible to retroact on a parameter of the laser which governs the laser emission frequency. Numerous solutions are envisaged and/or already used. The use of rigid and ultrastable optical cavities gives noteworthy and unequalled results in terms of short-term frequency stability, (range of $10^{-15}$ or indeed of $10^{-16}$ in relative values, for integration times of between 1 s and 100 s typically). This process nonetheless remains confined to laboratory applications since it requires rigorous stabilization of the optical length which is very sensitive to the thermal and mechanical environment of the cavity. Another solution consists in comparing the frequency of the IR laser with a frequency beating arising from an interferometer of Michelson type, produced with two optical fibers constituting the two arms of the interferometer, one very short (<1 m), the other longer (~km). The residual frequency instabilities attained by this solution are in the range of $10^{-14}$ in relative value, for integration times of between 1 ms and 1 s. However, as in the previous case, severe seismic isolation (anti-vibration table) and a severe thermal and phonic environment are required. A third solution consists in using atomic or molecular absorption lines in the IR or the red for the frequency stabilization of the IR laser.

The use of IR molecular absorption lines to stabilize the emission frequency of IR lasers is the most commonly (and oldest) process used, especially in the case of compact and transportable devices. Said lines are numerous in the infrared (carbon monoxide CO, acetylene C2H2, hydrogen cyanide HCN, etc.), but unfortunately exhibit either a low absorption coefficient, or a mediocre quality factor, or indeed both at the same time. The quality factor (Q) of an absorption line is defined as the ratio between its central frequency (F) and its width at mid-height ($\Delta F$). The quality factor $Q=F/\Delta F$ directly determines the short-term frequency stability of the slaved laser, the residual frequency instability of the slaved laser being proportional to $1/(Q \times S/N)$, where S/N is the signal-to-noise ratio of the detected line. A recent publication (J. Hald et al., "Fiber laser optical frequency standard at 1.54 µm", OPTICS EXPRESS, Vol. 19, No. 3/January 2011) alludes to a stabilization of $5 \times 10^{-13}$ @ 1 s with a fibered laser operating at 1542 nm slaved to a line of 13C2H2. However, the experimental device employed, hardly compatible with transportable use, favors short-term frequency stability to the detriment of long-term stability. Moreover, this performance level is restricted to the 1542-nm wavelength used and may not be achieved throughout the entire conventional C band.

Another approach for the frequency stabilization of IR lasers is the use of their double frequency to use the absorption lines of a few alkalines in the visible: rubidium Rb (line with 1 photon @ 780 nm, with 2-photons @ 778 nm), cesium Cs (@ 852 nm), potassium K (@ 767 nm), etc. A commercial version of a 1556-nm laser, stabilized by using a Rubidium atom 2-photon transition at 778 nm, developed by a Canadian company for the ALMA (Atacama Large Millimeter Array) project thus exhibits performance equivalent to that achieved in a laboratory type environment with the lines of C2H2 at 1.5 µm (see for example J. F. Cliche et al., "Turnkey compact frequency standard at 1556 nm based on Rb two-photon transitions," Conference on Precision Electromagnetic Measurements (CPEM), Digest, 674-675 (2004)).

These publications show that the use of the absorption lines situated in the IR or the red, by using the fundamental frequency of IR lasers or its second harmonic, leads to limited performance in terms of frequency stability. The frequency stabilization of these same IR lasers is moreover limited to a few wavelengths determined by the existence of absorption lines and therefore is not optimal especially for applications to optical telecommunications.

Some publications have exploited the benefit of stabilization based on the lines of iodine (I2) in the green, by using the generation of 3$^{rd}$ harmonic of the IR laser. Indeed, the iodine molecule exhibits a strong absorption band in the spectral range which extends from 500 to 750 nm. Thus, the article by M. Marangoni et al. ("Simultaneously phase-matched second- and third harmonic generation from 1.55 µm radiation in annealed proton-exchanged periodically poled lithium niobate waveguides", Opt. Lett. Vol. 31, No. 18 (2006)), describes a process making it possible to generate the 3rd harmonic of a laser operating at 1.5 µm, by using one and the same crystal to achieve both the doubling and the sum of frequencies. A power of 34 nanoWatts has been obtained at 523 nm with a lithium niobate dielectric structure of waveguide structure type periodically polarized by proton exchange (or (APE)PPLN for ("annealed proton exchanged periodically poled niobate lithium") by using a laser power of 16 mW at 1570 nm. These power levels in the range of nano-Watts do not make it possible, however, to saturate the lines of iodine so as to achieve effective frequency slaving, the power level required to probe the transitions of iodine being greater than 1 mW.

An object of the invention is to propose a generator of phase-coherent infrared and visible laser beams of high optical power (typically greater than several tens of mW in the green and greater than some hundred mW in each of the red or infrared beams available simultaneously). Such a generator will be able to allow for example the frequency stabilization of an IR laser operating on the entire C, L bands, or indeed even partially the S band, of optical telecommunications on the ultrafine lines of molecular iodine. It will also be able to be applied in the field of biology as well as for laser telemetry purposes wherein the use of three coherent radiations makes it possible to circumvent knowledge of the atmospheric propagation conditions.

SUMMARY OF THE INVENTION

According to a first aspect, the invention relates to a generator of at least three coherent laser beams including one beam at least, in the infrared domain and one beam at least, in the visible domain comprising:
- an elementary source for the emission of a first continuous laser beam, at a first given infrared wavelength;
- a nonlinear frequency-doubling crystal, allowing a second laser beam at a second wavelength to be generated on the basis of a first beam sampled from the first laser beam at the first wavelength;
- a nonlinear frequency-sum-generating crystal, allowing a third laser beam at a third wavelength to be generated on the basis of a second beam sampled from the first laser beam at the first wavelength and of the second laser beam at the second wavelength.

In a known manner, coherent laser beams are laser beams exhibiting a mutually fixed phase relation.

The applicants have shown that such a generator made it possible by virtue of particular arrangement of the components to obtain unequalled optical powers for the three coherent beams in the infrared and the visible domain, (for example red and green), doing so in a broad spectral band. According to one embodiment, the generator of laser beams furthermore comprises means for stabilizing the emission frequency of the elementary source on an absorption line of molecular iodine, by using the third laser beam generated at the third wavelength. Three frequency-ultrastable beams, applications of which are numerous, are then obtained at the output of the generator. On account of the high density of absorption lines of molecular iodine in the visible, the stability of the beams can be obtained over a broad spectral band, covering, especially in the infrared, the C, L bands and part of the S band of optical telecommunications, as a function of the elementary sources available.

According to a variant, the generator of laser beams furthermore comprises means of control of the optical power of the beam at the first wavelength, at the input of the nonlinear frequency-sum-generating crystal, by using the third laser beam generated at the third wavelength. This loop for control of the optical power at the input of the frequency-sum-generating crystal allows especially real-time optimization of the coupling parameters and optimization of the operation of the crystal.

According to a variant, the generator of laser beams furthermore comprises an optical amplifier for the amplification of the first laser beam at the first wavelength. The broad spectral band optical amplifier makes it possible to obtain the required power at the input of the doubling crystal, for various types of elementary laser sources.

To gain space and to facilitate optical adjustments, the generator of laser beams may be wholly or partially fibered.

According to a variant, the generator of laser beams furthermore comprises frequency-doubling or frequency-sum-generating means for obtaining, on the basis of at least one of the second or third beam, a fourth, coherent, laser beam at a fourth wavelength in the UV. Four or more, coherent, high optical power beams which can be stabilized on a line of molecular iodine are then obtained.

The generator of laser beams according to the first aspect can be used for the stabilization of the emission lines of a femtosecond laser source. According to a second aspect, the invention thus relates to a module for frequency stabilization of the emission lines of a femtosecond laser source, comprising:
- a generator of laser beams according to the first aspect, wherein the beams are stabilized on an absorption line of molecular iodine;
- a first optical beat module (620) intended to produce an optical beating between a pulse train emitted by the femtosecond laser source, filtered optically at a first wavelength, and a first reference laser beam, generated by the generator of laser beams at a wavelength substantially identical to the wavelength of the filtered pulse train;
- a frequency slaving module allowing the control of the difference in frequencies between the frequencies of the filtered pulse train and of the first reference laser beam on the basis of the signal arising from the optical beat module.

It is thus possible to stabilize with the intrinsic lines of molecular iodine all the lines emitted by the femtosecond laser and, corollary, the frequency difference between two lines (microwave or terahertz domain).

According to one embodiment, the frequency stabilization module furthermore comprises:
- a second optical beat module intended to produce an optical beating between a pulse train emitted by the femtosecond laser source, filtered optically at a second given wavelength, and a second reference laser beam, generated by the generator of laser beams at a second wavelength substantially identical to the wavelength of the filtered pulse train,
- the slaving module comprising an electronic mixer making it possible to obtain the difference between the first difference in frequencies between the frequencies of the filtered pulse train at the first wavelength and of the first reference laser beam and the second difference in frequencies between the frequencies of the filtered pulse train at the second wavelength and of the second reference laser beam.

In this case, the use of the frequency-doubled and frequency-tripled radiations of the generator of beams makes it possible to frequency stabilize a femtosecond laser without needing self-referencing.

The invention thus relates, according to a third aspect, to an ultrastable femtosecond laser source comprising a femtosecond pulse emission laser source and a module for frequency stabilization of the emission lines of the femtosecond pulse emission laser source according to the second aspect.

According to a fourth aspect, the invention relates to a method of generating at least three coherent laser beams including one beam at least, in the infrared domain and one beam at least, in the visible domain comprising:
the emission of a first continuous laser beam, at a first given infrared wavelength;
the generation, on the basis of a first beam sampled from the first laser beam, by means of a nonlinear frequency-doubling crystal, of a second laser beam at a second wavelength;
the generation, on the basis of a second beam sampled from the first laser beam at the first wavelength and of the second laser beam at the second wavelength, by means of a nonlinear frequency-sum-generating crystal, of a third laser beam at a third wavelength.

According to a variant, the method of generating laser beams furthermore comprises the stabilization of the emission frequency of the elementary source on an absorption line of molecular iodine, by using the third beam generated at the third wavelength.

According to a variant, the method of generating laser beams furthermore comprises the control of the optical power of the beam at the first wavelength, at the input of the nonlinear frequency-sum-generating crystal, by using the third beam emitted at the third wavelength.

According to a variant, the method of generating laser beams furthermore comprises the modulation of the laser beam at the incident infrared wavelength in the nonlinear frequency-sum-generating crystal, as a function of a coding signal. The coding signal may be for example and not exclusively a coding signal for optical telecommunications. Alternatively, the method of generating laser beams can comprise the modulation of the visible laser beam at the output of the nonlinear crystal.

The invention also relates to a method of frequency stabilization of the emission lines of a femtosecond laser source comprising:
the optical beating between a pulse train emitted by the femtosecond laser source, filtered optically at a first wavelength, and a first reference laser beam, generated according to the method described according to the fourth aspect, at a wavelength substantially identical to the wavelength of the filtered pulse train;
the control of the difference in frequencies between the frequencies of the filtered pulse train and of the first reference laser beam on the basis of the signal arising from the optical beat module.

According to a variant, the frequency stabilization method furthermore comprises:
the optical beating between a pulse train emitted by the femtosecond laser source, filtered optically at a second wavelength, and a second reference laser beam, generated according to the method described according to the fourth aspect, at a second wavelength substantially identical to the wavelength of the filtered pulse train;
the control of the difference between the first difference in frequencies between the frequencies of the filtered pulse train at the first wavelength and of the first reference laser beam and the second difference in frequencies between the frequencies of the filtered pulse train at the second wavelength and the second reference laser beam.

BRIEF DESCRIPTION OF THE DRAWINGS

Other advantages and characteristics of the invention will become apparent on reading the description, illustrated by the following figures:

FIGS. 1A and 1B, two examples of a generator of infrared and visible coherent laser beams according to the present description, in a mode of propagation respectively in free space and in fibered space.

FIGS. 3A to 3D, diagrams showing the absorption lines of molecular iodine;

DETAILED DESCRIPTION

Figures 2A, 2B:
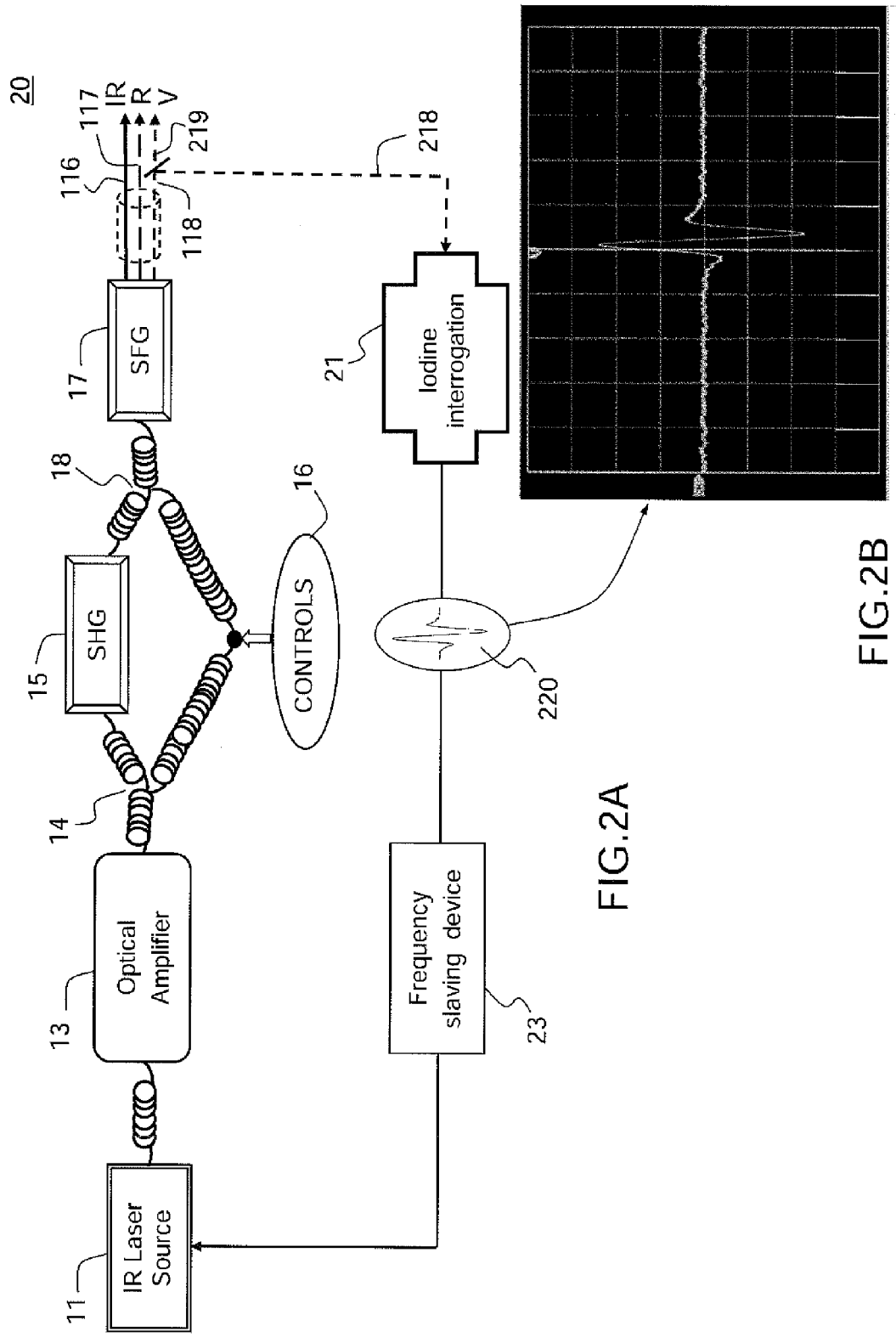
FIG. 2A, an example of a generator of laser beams according to one embodiment, furthermore comprising frequency stabilization on an absorption line of molecular iodine, and FIG. 2B, an example of a signal emitted by the iodine interrogation module for the frequency stabilization and obtained by the frequency-tripled IR laser according to the method of generating beams described in the present patent application.

In the figures, identical elements are labeled by the same references.

FIGS. 1A and 1B illustrate according to two embodiments a generator of coherent laser beams according to the present invention.

The laser beam generator $10_A$ represented in FIG. 1A illustrates an example of a generator according to the present invention operating in a mode of propagation of the beams in free space. It comprises a continuous infrared laser source 11, an optical amplifier 13, a frequency-doubling crystal or SHG (for "Second Harmonic Generation") 15 and a frequency-sum-generating crystal or SFG (for "Sum-Frequency Generation") 17. The optical amplifier, for example an Erbium-doped fiber amplifier, makes it possible to provide the necessary optical power when the emission power of the laser source is insufficient. The optical amplifier exhibits the advantage of a broad spectral band; a single component can therefore be used when the laser source is changed in order to cover the telecoms C or L band for example. The amplifier can also be integrated into the source. It is also possible to dispense with an optical amplifier if the optical emission power of the source is sufficient. The infrared laser source is for example a wavelength-tunable laser emission source, for example an Erbium-doped fiber laser or a laser diode. The Er-doped fiber laser generally exhibits a more considerable tunability (wavelength tunability over about 1000 pm) than that of the laser diode (about 50 pm). The laser diode exhibits the advantage of compactness and the possibility of slaving via the injection current, as will be described in greater detail subsequently.

The crystals for the doubling and the frequency sum generation are for example lithium niobate (LiNbO3) crystals. Other crystals can be used in a known manner, such as for example Potassium Titanyl Phosphate, used as a periodically polarized structure (or PPKTP). According to the generating process described in the present description, the laser beam 111 emitted by the infrared laser source 11 and amplified by means of the optical amplifier 13 is split into two beams 113 and 114, the ratio of the optical powers on each of the pathways being able to be optimized as a function of the powers required downstream in the generator. The first beam (114) is directly coupled in the first LiNbO3 nonlinear crystal 15 to generate a $2^{nd}$-harmonic laser beam 115, in the red of the first beam 114, of wavelength 772 nm for example. An appropriate optical filter 19 makes it possible to cut off the residual IR radiation arising from the first nonlinear crystal 15. The second IR beam (113), which has not passed through the first nonlinear crystal 15, is superposed on the beam 115 previously generated in the red, the two beams 113 and 115 being coupled in the second nonlinear crystal 17 so as to produce the sum of Red and infrared IR frequencies, resulting in a beam 118 of visible wavelength, at 515 nm for example. The other beams 116 and 117 arising from the second nonlinear crystal 17 are the residual beams respectively in the infrared and in the red. Advantageously, a control module 16 makes it possible to control coupling parameters for the second IR beam 113 with a view to coupling in the second nonlinear crystal 17, these parameters being able to be geometric, polarization and/or power parameters. Temperature slaving of the nonlinear crystals can also be performed to ensure the optimization of the operation of these crystals. As will be described subsequently, the control module can comprise, in particular, means of control of the optical power of the IR beam at the input of the frequency-sum-generating nonlinear crystal 17, which are slaved to the optical output power in the green (beam 118). The generator can also comprise means, which will be described in greater detail subsequently, for modulating the frequency for the frequency stabilization of the IR beam.

The generator thus described allows the emission of three optical radiations which are phase coherent (since they arise from the same infrared laser beam) in the green band of the visible spectrum at the same time as in the IR and Red bands. The applicant has already shown experimentally that the laser beam generator thus described allows the emission of powerful optical radiations at 1541 nm and at 1544 nm, by using respectively a laser diode and a fiber laser. The method can be extended within all or part of the conventional bands C (between 1530 nm and 1565 nm), L (between 1565 nm and 1620 nm) and S (below 1530 nm) especially because of the fact that controls of the coupling parameters for the second IR beam 113 at the input of the second nonlinear (frequency-sum-generating) crystal are possible independently of the parameters of the first IR beam 114 at the input of the first nonlinear (frequency-doubling) crystal. Thus, for an optical power of 1 Watt at 1.54 μm at the output of the optical amplifier 13, optical powers of 30 mW and 140 mW respectively at the 3rd harmonic (515 nm) and at the 2nd harmonic (772 nm) have forthwith been obtained with nonlinear lithium niobate crystals. In the green, this corresponds to a power 20 000 times greater than that published in the articles known from the prior art. Optical powers greater than 100 mW are expected in the green by optimizing the choice of the nonlinear crystals. A gain of a factor greater than 60 000 is then achievable with respect to the prior art.

In the example of FIG. 1A, the beams 116 and 117 are the residual beams respectively in the infrared and in the red. In an equivalent manner, in order to obtain coherent beams in the infrared and in the red, it is possible to sample the beam 114 arising from the laser beam 111 emitted by the infrared laser source 11 after amplification by means of the optical amplifier 13 as well as to sample the laser beam 115 generated by the first nonlinear crystal 15 of LiNbO3. In this case, the red and infrared beams sampled preserve their coherence with the green G beam 118. As is represented in FIG. 1B, the generator can be produced in "all-fibered" technology, allowing especially a gain in terms of volume of the generator and a greater ease of control of the coupling parameters at the input of the nonlinear crystals, especially the geometric and polarization parameters. Thus, in the laser beam generator $10_B$ illustrated in FIG. 1B, all or some of the components can be fibered and linked by polarization-maintaining fibers or connectors. In particular, the generator comprises an infrared laser source 11, for example a laser diode, whose output is fibered, by means of a polarization-maintaining fiber 12. A coupler 14 at the emission wavelength of the infrared source, for example a 50/50 coupler of polarization-maintaining FC/APC type, allows the splitting of the infrared beam 111 at the output of the optical amplifier into two beams 113, 114. A coupler 18 optimized to the red and infrared wavelengths allows the coupling at the input of the second nonlinear crystal 17 between the red beam 115 arising from the doubling crystal 15 and the infrared beam 113 arising directly from the infrared emission source 11. The coupler 18 is for example a polarization-maintaining WDM coupler. Alternatively, as a function of the characteristics of the nonlinear crystal used, the coupling can be done inside the nonlinear frequency-sum-generating crystal. The nonlinear crystals 15, 17 are advantageously fibered at input and at output. The generator comprises a fibered or non-fibered output according to the needs of the use. According to a variant, the output which is fibered can be linked to frequency stabilization means, as will be described subsequently. A control module 16 in an all-fibered generator of the type of that described in FIG. $10_B$ can make it possible to control the input optical power. Moreover, means for modulating the frequency can be provided, as will be described subsequently. In an all-fibered mode of the generator according to the present description, volumes of less than 1 or 2 liters will be able to be achieved, these being compatible with industrial and onboard applications.

In the subsequent description, the generators described will be able to operate in free-space propagation mode, in fibered propagation mode, or in a mixed mode, without this being specified again.

A first application of a generator such as described in FIGS. 1A and 1B relates to laser telemetry. The absolute measurement of distance in the presence of the atmosphere demands a knowledge of numerous atmospheric parameters such as temperature, pressure and relative humidity. The absence of precise knowledge of these parameters is one of the considerable limitations to precise knowledge of the distance "measured" by a conventional laser telemeter. A theoretical model proposed since 1994 (A. N. Golubev et al., "Three-color optical range finding", Appl. Optics, Vol. 33

No. 31, (1994)) makes it possible to circumvent this difficulty on condition that three coherent radiations are used. The laser beam generator described in the present patent application allows the generation of these radiations, with unequalled optical powers. It thus makes it possible to circumvent the propagation conditions (moisture, pressure, temperature of the environment). An immediate application of the generator of laser beams according to the present description, and especially in the "all-fibered" variant which allows a minimum bulk, thus resides in the improving of the conditions of aircraft formation-flying or in respect of the surveillance and the monitoring of large public works sites.

A second application relates to the generation of coherent radiations of high power, which are ultrastable in terms of frequency, for example for applications in optical telecommunications wherein an increase in the number of communications channels is sought. In very long distance (intercontinental) optical telecommunications, for which a maximum coherence length is required, the generation of high-power frequency-ultrastable coherent radiations makes it possible to also achieve much better performance. Reducing the frequency instabilities of the laser leads to reduced instantaneous line width, and therefore to increased coherence length.

FIG. 2A thus represents a simplified diagram of a generator 20 of coherent laser beams according to an embodiment of the present invention. According to this embodiment, the generator comprises in addition to the elements already described, means for stabilizing the emission frequency of the infrared source 11 on an absorption line of molecular iodine, by using a fraction 218 of the beam 118 emitted in the green. The optical power generated in the green (several tens of mW) does indeed allow the utilization of the extended spectrum of the absorption lines of molecular iodine throughout the 510 nm-521 nm spectral band, thus making it possible to stabilize the frequency of the IR radiations (and therefore of the Red & Green radiations) with performance which is unequalled to date for a laser operating in the infrared, especially in the conventional C band (1530 nm-1565 nm). More precisely, the stabilization means comprise a module 21 for interrogating the iodine and a frequency slaving device 23 for the frequency control of the infrared source 11. The iodine interrogation module calls upon the known so-called "saturated absorption" technique described for example in the article by P. H. Lee et al. ("Saturated Neon absorption inside a 6328 A laser", Appl. Phys. Lett., Vol. 10, No. 11, 1 Jun. 1967). The latter consists in interrogating the iodine vapor with two contrapropagating beams with a view to constructing a frequency discriminant of high metrological quality. We then generate an odd symmetry error signal 220 of low width and a considerable signal-to-noise ratio, an example of which is illustrated in FIG. 2B, which represents the voltage signal as a function of frequency (1 MHz/division along the abscissa). The error signal 220 is dispatched to a frequency slaving device 23 some examples of which will be given in detail subsequently. Note that only a few mW being necessary for the interrogation of the iodine, the power available in the green beam 219 at the output of the generator will be able to remain entirely utilizable for its use.

The generator of infrared and visible laser beams such as is described in FIG. 2A makes it possible to generate at 1.54 µm a frequency stability of better than $10^{-14}$ in terms of relative value, for integration times of between 1 s and 1000 s. On account of the spectral extent of the absorption band of molecular iodine between 500 and 750 nm and of the intensity of the lines (more than $10^6$ hyperfine lines in the entire visible domain), a stability of better than $10^{-14}$ may be expected for example over the whole of the conventional C band, by using the transitions of iodine between 510 and 521 nm. This possibility is extended to the L band of optical telecommunications by using the transitions of iodine between 521 nm and 540 nm.

FIGS. 3A to 3D represent the absorption lines of iodine between 500 and 750 nm (FIG. 3A), in a finer spectral band of about 0.2 nm (200 GHz) around 514.5 nm (FIG. 3B), around 514.5 nm over a band of about 1 GHz, (FIG. 3C) and at 514.581 nm over a band of about 300 kHz (FIG. 3D). The absorption of iodine covers the whole of the visible spectrum, illustrated in FIG. 3A. The hyperfine lines of iodine are all the narrower as one approaches the molecule's dissociation limit, around 500 nm, but around this value, the intensities of the lines are weaker. FIG. 3B illustrates a portion of the absorption spectrum in the green, over a spectral span of 0.2 nm in the vicinity of 515 nm, corresponding to a spectral band of about 200 GHz, and which exhibits a good compromise between the quality factor of the lines of molecular iodine ($Q \sim 2 \times 10^9$ at 515 nm) and the nature and the intrinsic quality of the available laser sources. Each line represented in FIG. 3B decomposes into a hyperfine clump which is spread over about 1 GHz, and an example of which is represented in FIG. 3C. FIG. 3D represents the narrow transition of iodine at 514.581 nm.

Thus, more than 10 000 saturated absorption lines of iodine are identified in the range 510 nm-521 nm, constituting a veritable comb of ultrastable frequencies that may be used to frequency stabilize any laser operating for the whole of the C band of optical telecommunications (1530 nm-1565 nm), by virtue of the process for generating laser beams according to the present description. The very narrow lines of iodine (FIG. 3D), are grouped into hyperfine clumps which break down into 15 or 21 components spread over less than 1 GHz (FIG. 3C). This approach is possible also over the entire extent of the L band of optical telecommunications (1565 nm-1620 nm), and partially over the S band (1500 nm-1530 nm). Of course, the lines of iodine possess different intensities and quality factors (Q factor defined previously), and do not confer the same performance when they are used as frequency discriminant for the laser stabilization. The saturation lines of iodine are all the narrower the higher their central frequency (toward the blue) thus increasing their quality factor Q ($>10^9$ in the vicinity of 515 nm). By way of example, the line of iodine at 633 nm which is used to slave the very popular He—Ne laser which emits in the red possesses a quality factor $Q=5 \times 10^7$, whereas those at 515 nm have a factor $Q \sim 4 \times 10^9$, i.e. a gain by a factor of nearly 100, for equivalent signal-to-noise ratio. Moreover, the lines of iodine in the green are much more intense and narrower, thus increasing the short-term frequency stability.

He—Ne lasers stabilized in the red at 633 nm have a short-term frequency stability of the order of $10^{-12}$ at 1 s and $10^{-11}$ for times >100 s, whereas Nd:YAG lasers, frequency doubled, stabilized on transitions at 532 nm have already attained the noteworthy level of $1.2 \times 10^{-14}$ at 1 s, and of $2 \times 10^{-15}$ for integration times of 200 s to 10000 s. It is this noteworthy level of performance which is aimed at by the generator of infrared and visible laser beams, for any laser operating in the conventional C band of optical telecommunications (1530 nm-1565 nm), by using the lines of molecular iodine (510 nm-521 nm), after tripling of the frequency of the IR laser according to the process described in the present patent application. The wavelength multiplexing (WDM) fixed by ITU-T standard G 642 in regularly spaced communications channels (50 GHz today) is backed up with the transition frequency of a line of acetylene 13C2H2 P(16) at 1543.383 nm. With the process for generating ultrastable laser beams which is described in the present patent application, it is possible to use the hyperfine transitions of molecular iodine (R 48 (42-0) and/or R 42 (44-0) in quasi-coincidence with the channels 24 and 27 respectively) as potential references of the same grid of WDM channels currently in force, and to thus continue to use the whole of the existing technology, especially in terms of IR lasers.

Figure 4A:
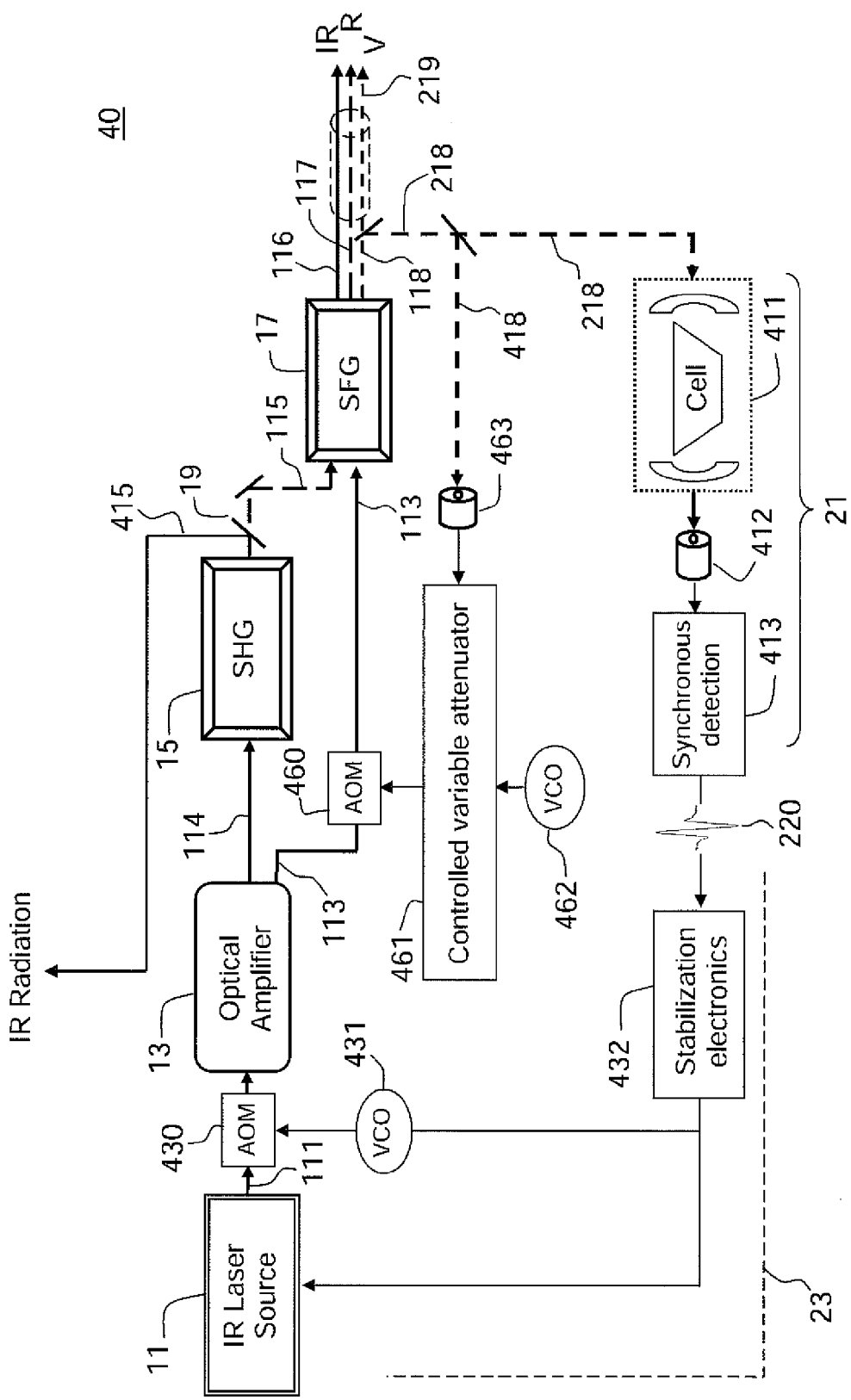
FIGS. 4A to 4C, diagrams illustrating different variants of a generator according to the present description for the generation of ultrastable infrared and visible coherent laser beams.
Figure 4B:
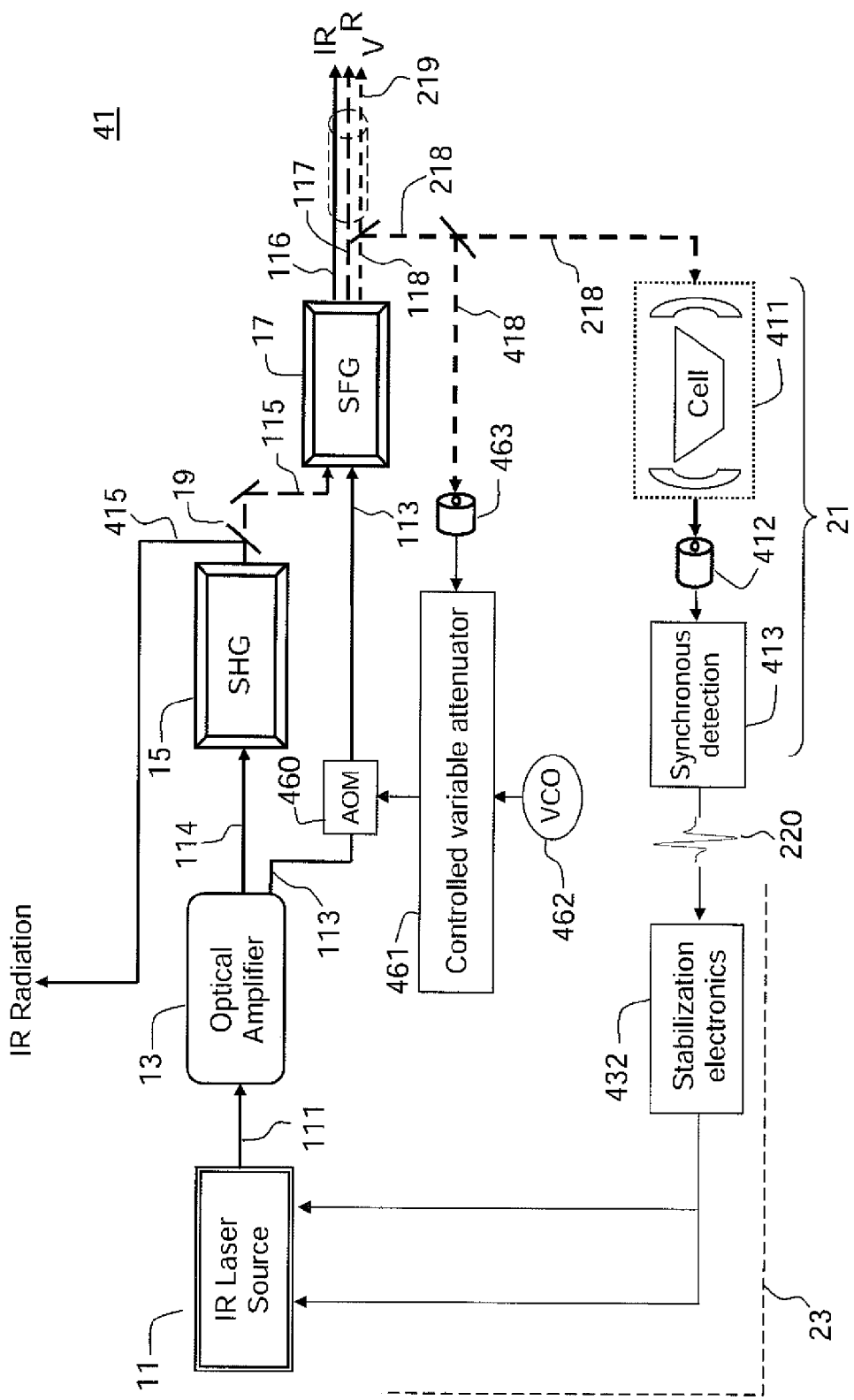
Figure 4C:
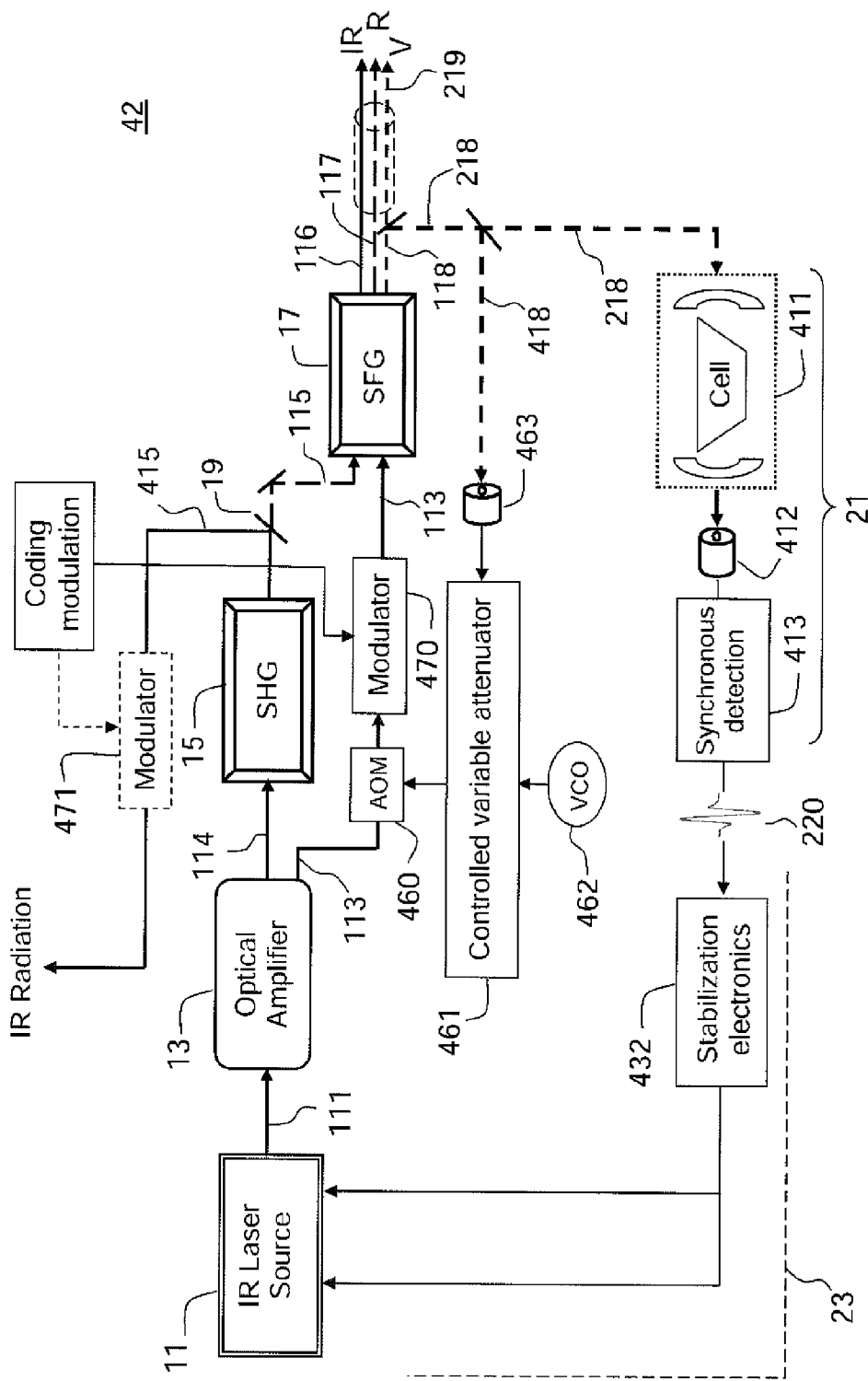

FIGS. 4A, 4B and 4C illustrate by diagrams variants of generators of laser beams (40-42) according to the present description, for the implementation of processes for generating ultrastable coherent laser beams. FIG. 4A illustrates the frequency stabilization in the case of the use of a continuous infrared laser source 11 of fiber laser type; FIG. 4B illustrates the frequency stabilization in the case of the use of a continuous infrared laser source 11 of laser diode type; FIG. 4C illustrates the application of a generator of the type of that shown in FIG. 4B for optical telecommunications.

The laser beam generator 40 shown diagrammatically in FIG. 4A comprises the same elements as those represented in FIG. 1A, 1B or 2. More precisely, in this example, the infrared laser source 11 is for example an Er-doped fiber commercial IR laser operating in the 1530 nm-1565 nm spectral band. This laser will be able to be replaced with a very compact laser diode operating in the desired wavelength band (see FIG. 4B). These lasers deliver an optical power of 10-20 mW. The output of the laser used is for example polarization-maintaining fibered. The output connector is of FC/APC type. The generator 40 furthermore comprises a first, likewise polarization-maintaining fibered, acousto-optical modulator 430 between the IR laser 11 and the optical amplifier 13, the latter delivering an output power of 1 Watt throughout the entire 1530 nm-1565 nm band. The RF frequency which excites this AOM to generate the diffracted optical wave to order +/−1 (Bragg angle) is equal to 40 MHz, for example. It is generated by a voltage-controllable RF oscillator 431 or VCO for "voltage controlled oscillator". This first acousto-optical modulator can have several functions. It can make it possible to optically isolate the IR laser 11 and the optical amplifier 13. It can also allow corrections of fast frequency fluctuations of the IR laser, as described further on. The IR radiation corrected of the frequency fluctuations is divided into two parts 114, 113, for example with the aid of polarization-maintaining optical fibers, and FC/APC connectors. A first output of the amplifier is coupled to the first nonlinear Lithium Niobate (LiNbO3) crystal 15 fibered at input, so as to generate the $2^{nd}$ harmonic of the IR frequency. The second output of the amplifier is coupled to the second nonlinear crystal 17 which produces the sum of frequencies for the generation of the green radiation. The non-linear crystal 15 used to double the IR frequency is of the Lithium Niobate type, as a waveguide structure, periodically polarized (PPLN). The crystal is for example placed in a furnace so as to temperature stabilize it, to better than 1 mK, with the aid of Peltier-effect modules and dedicated electronics (PID type, proportional-integral-derivative). This first crystal possesses for example an optical grating spacing of the order of 18 µm, and operates at a temperature of around 50° C. A dichroic filter 19 placed downstream of the crystal 15 separates the red radiation generated (115) from the fundamental IR radiation (415). The latter is not injected into the frequency summator crystal so as to avoid creating an amplitude modulation harmful to the $3^{rd}$ harmonic. On the other hand, it can be recovered with the aid of a dichroic filter (19) so as to constitute an ultrastable IR frequency reference 415. The entirety of the $2^{nd}$ harmonic power generated (beam 115) is coupled in the second crystal to obtain the $3^{rd}$ harmonic of the IR laser. The non-linear crystal 17 used for the sum of frequencies (F and 2×F) is also of the Lithium Niobate type, as a waveguide structure, periodically polarized (PPLN). Its temperature is regulated to better than 1 mK, with the aid of a slaving device of PID (proportional-integral-derivative) type, similar to that used for the frequency doubling hereinabove. The crystal 17 possesses for example a grating spacing of the order of 6 µm and operates in the vicinity of 19° C. Two dichroic filters (not represented) make it possible to spatially separate the 3 radiations, IR, Red and Green, which constitute the comb of ultrastable and phase coherent frequencies, at the output of the frequency-sum-generating crystal 17.

When the non-linear frequency-sum-generating crystal 17 is used in free space, a micromechanical support (not represented in FIG. 4A) allowing precise positioning of the crystal according to the 3 axes in space with respect to the laser beams can be used. Moreover, shaping lenses (not represented), specific to the two wavelengths (specific anti-reflection treatment) can be used on the path of the two beams IR (deviated upstream of the 1st crystal) and red transmitted by the 1st crystal. Their function is to maximize the overlap between the two radiations which are summed in the second crystal 17. Two phase plates (half-wave), not represented, specific to each wavelength (IR and Red) can also be used on the path of each of the beams to ensure the parallelism of the two states of polarization, IR and Red. The dichroic plate 19 at the output of the first frequency-doubling crystal 15 makes it possible to block any residual transmitted, at the fundamental frequency (IR), at the same time as it transmits the maximum of red power (at 2×F). A second dichroic plate, not represented, can thereafter be used to superpose the two beams, IR and red, in the frequency-sum-generating crystal 17. When the non-linear frequency-sum-generating crystal 17 is used in a fibered propagation mode, a coupler (18, FIG. 1B or 2A) allows the coupling of the two beams, IR 113 and red 115, in the frequency-sum-generating crystal 17, in such a way that the second dichroic plate or the shaping optics are no longer necessary. An appropriate optical treatment can be applied to the fiber at the output of the module 115 to block the residual fundamental radiation. It is also possible to use a fiber operating in the red, which then blocks the IR radiation, of larger wavelength. The coupler is for example optimized according to the following characteristics: a first port is a polarization-maintaining fiber optimized in the red, for example at 772 nm. Second and third ports are optimized in the infrared, for example at 1.5 µm. The insertion losses at 772 nm (input-output of the coupler) are 1.2 dB at the maximum. The insertion losses at 1.5 µm (input-output of the coupler) are 1.0 dB at the maximum. On account of the choice of polarization-maintaining fibers, the phase plates are no longer necessary.

In the example of FIG. 4A, control of the optical power of the IR beam (113) at the input of the frequency-sum-generating crystal is performed, for example by means of a second acousto-optical modulator 460 positioned on the pathway of the non-doubled IR beam 113, between the optical amplifier 13 and the frequency-sum-generating crystal 17. Accordingly, a small fraction 418 (<0.1 mW) of the output beam in the green is sampled to act after detection by means for example of a photodiode 463, on a current-controlled radiofrequency (RF) electronic attenuator 461 situated between the acousto-optical modulator 460 and a radiofrequency source 462 which drives it. The control of the optical power of the IR beam at the input of the frequency-sum-generating crystal 17 makes it possible for example to compensate for any temperature drift or coupling drift liable to impair the optimal operation of the nonlinear crystal.

In the example of FIG. 4A, a second part of the $3^{rd}$ harmonic power (<10 mW) is used to interrogate the molecular iodine vapor to construct a reference signal which will be used to stabilize the frequency of the IR laser. The remainder of the optical power (beam 219 collinear with the IR beam 116 and red beam 117) is made available to the use. As described previously, an iodine interrogation module 21 comprising an iodine-filled quartz cell 411, a detector 412 and a device for detecting the iodine line absorbed allows the generation of an error signal 220 dispatched to the frequency slaving device 23. More precisely, the green beam is split into two components termed pump and probe. The iodine-filled quartz cell 411 is disposed on the path of these two pump and probe beams, which are contra-propagating. The detector 412 placed downstream of this cell gathers the probe beam transmitted by the cell and which bears the frequency modulation which makes it possible to generate an odd harmonic of the iodine saturation line. The electrical signal at the output of the detector 412 is compared with the modulation signal by means of a synchronous detection 413 so as to formulate a so-called frequency correction (odd) signal 220. The odd signal arising from the "iodine interrogation" device 21 is transmitted to stabilization electronics 432 (of PI type: proportional, integral) so as to act on an element specific to the laser, and the function of which is to govern the emitted frequency (ceramic piezoelectric, diode current, temperature etc.). In the case of FIG. 4A (use of a fiber laser), an element external to the laser (AOM1) is acted on so as to slave the frequency of the laser (fast correction of fluctuations). Thus, the frequency correction signal 220 is used to correct the fast frequency fluctuations of the IR laser via the acousto-optical modulator 430 placed between the IR laser 11 and the optical amplifier 13. In this case, the frequency of the RF oscillator 431 which controls the acousto-optical modulator 430 and which ultimately determines the stability of the frequency of the IR laser, is slaved. A second signal (arising from a second integration of the previous signal) can be used to compensate for the slower frequency fluctuations (drift) by acting on the piezoelectric ceramic of the laser if the latter is of the fiber laser type (or its temperature). If a laser diode is used as IR source, then the injection current and the temperature of the laser diode are acted on respectively.

With the generator represented in FIG. 4A, it is thus possible to obtain the maximum harmonic power at 2×F, and at 3×F, within the limits allowed by the manufacturer in terms of IR power incident at the input of the nonlinear crystals; to optimize the spatial shape of the IR optical beam in such a way as to maximize the overlap with the red beam, in the second crystal, to tailor the state of polarization of the red and IR beams which must be identical, to independently optimize the IR power (at F) and red power (at 2×F) so as to maximize the power at the triple frequency (3×F); to use upstream of the frequency-sum-generating crystal optics specific to each of the IR and red wavelengths, so as to compensate for (minimize) the chromatic dispersion induced by the high index of the summator crystal and which is different for the two wavelengths. In the fibered mode case, the optical beams are naturally adapted when they travel in the same fiber and the polarization is preserved by virtue of the use of polarization-maintaining fibers. The IR and R powers are regulated by specific fibered AOMs placed on the corresponding arms.

The laser beam generator 41 shown diagrammatically in FIG. 4B is substantially similar to that represented in FIG. 4A but comprises only a single acousto-optical modulator 460 for the regulation of the power of the IR beam at the input of the frequency-sum-generating nonlinear crystal 17. In this example indeed, the IR laser source 11 is for example a laser diode. Correction of the fast frequency fluctuations is then possible by acting directly on the diode injection current. The acousto-optical modulator 430 represented in FIG. 4A can be dispensed with. The correction of the slow fluctuations is applied to the temperature of the diode. The generator 41 exhibits the advantage of being more compact.

FIG. 4C illustrates an application of the generator represented in FIG. 4B to telecommunications applications. According to a variant, when it is desired to superpose a code/modulation on the frequency or the amplitude of the beam at 1.5 µm, it is possible to insert an additional modulator 470 between the AOM 460 and the frequency-sum-generating crystal 17. This modulation will affect the IR and green beams, but not the red beam. In the case of a frequency modulation, the latter, in order to be compatible with the stabilization to the iodine line, will have to be markedly greater than that used for the needs of the slaving of the frequency of the source to the iodine line. If it is desired to decouple the 2 functions (stabilization to iodine and coding) the modulator can be inserted at the output of the beam generator on the residual IR pathway 116 or 415, as is illustrated with the modulator 471 represented dashed in FIG. 4C. In the latter case, the "generator of ultrastable frequencies" function and the "coding/information transfer modulation device" function are decoupled. Alternatively, the modulator can be inserted at the output of the beam generator on the pathway of the green G beam 118.

Other applications are conceivable for the generator of coherent laser beams, with high optical power, according to the present description.

Figure 5:
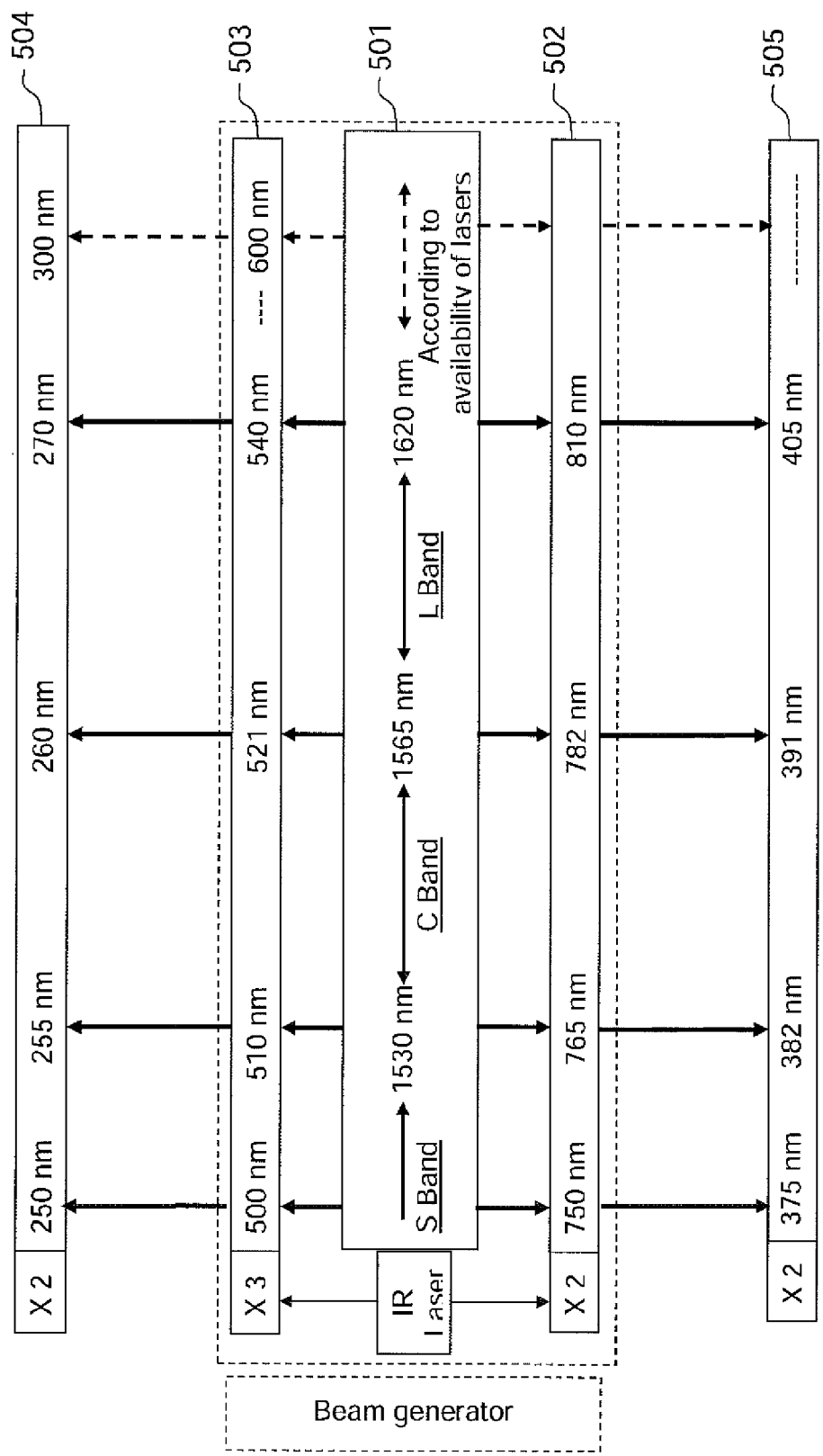
FIG. 5, a diagram illustrating the wavelength spans accessible by virtue of a process for generating coherent and ultrastable beams according to the present description.

For example, the generator of coherent laser beams can furthermore comprise means for doubling the red beam and/or the green beam, and/or means for frequency summation of the red and green beams so as to emit a fourth beam in the UV, which is coherent with the other beams generated. FIG. 5 thus illustrates respectively examples of wavelength bands 501 of the infrared radiation, 502 and 503 of the red and green radiations obtained by doubling and summing of frequencies according to the generating process described in the present description, 504 and 505 of the UV radiations obtained by doubling respectively of the green and red radiations. As explained previously, the availability of the iodine lines between 500 nm and 600 nm makes it possible by virtue of the process described in the present patent application and as a function of the availability of the infrared laser sources to generate coherent, ultrastable, radiations in a part of the S band as well as in the C and L bands, or indeed beyond, for infrared radiation. By frequency doubling, it is thereafter possible to generate coherent radiations in the UV, typically in the two bands [250 nm-270 nm] and [375 nm-405 nm], starting from lasers operating in the S, C or L optical telecommunications bands. By summation of the frequencies given at 503 and 502 (FIG. 5), it is possible to generate the UV transitions situated in the band [300 nm-324 nm]. The 3 bands referred to hereinabove in the UV are those which correspond to wavelength domains that can be linked to the iodine lines located in the spectral region 500 nm-540 nm.

The laser beam generator described in the present patent application can also be used for the frequency stabilization of femtosecond lasers. A so-called "self-referencing" technique is generally used to stabilize the global position of the frequency comb of a femtosecond (FS) laser. The doubling of the frequency of a line emitted by the FS at the low-frequency end of the spectrum makes it possible to compare the harmonic frequency with the same frequency emitted at the other (high-frequency) end of the same spectrum. A correction signal is then produced which makes it possible to stabilize the global position of the spectrum. This is obtained by retroacting on the pump current of the FS laser. However, the self-referencing technique described previously does not make it possible to ascertain the absolute frequency of each of the teeth of which the frequency comb is composed (lack of exactness). Moreover, the optical power emitted by each of the lines emitted by the FS laser is very low, typically less than 1μWatt.

Figure 6A:
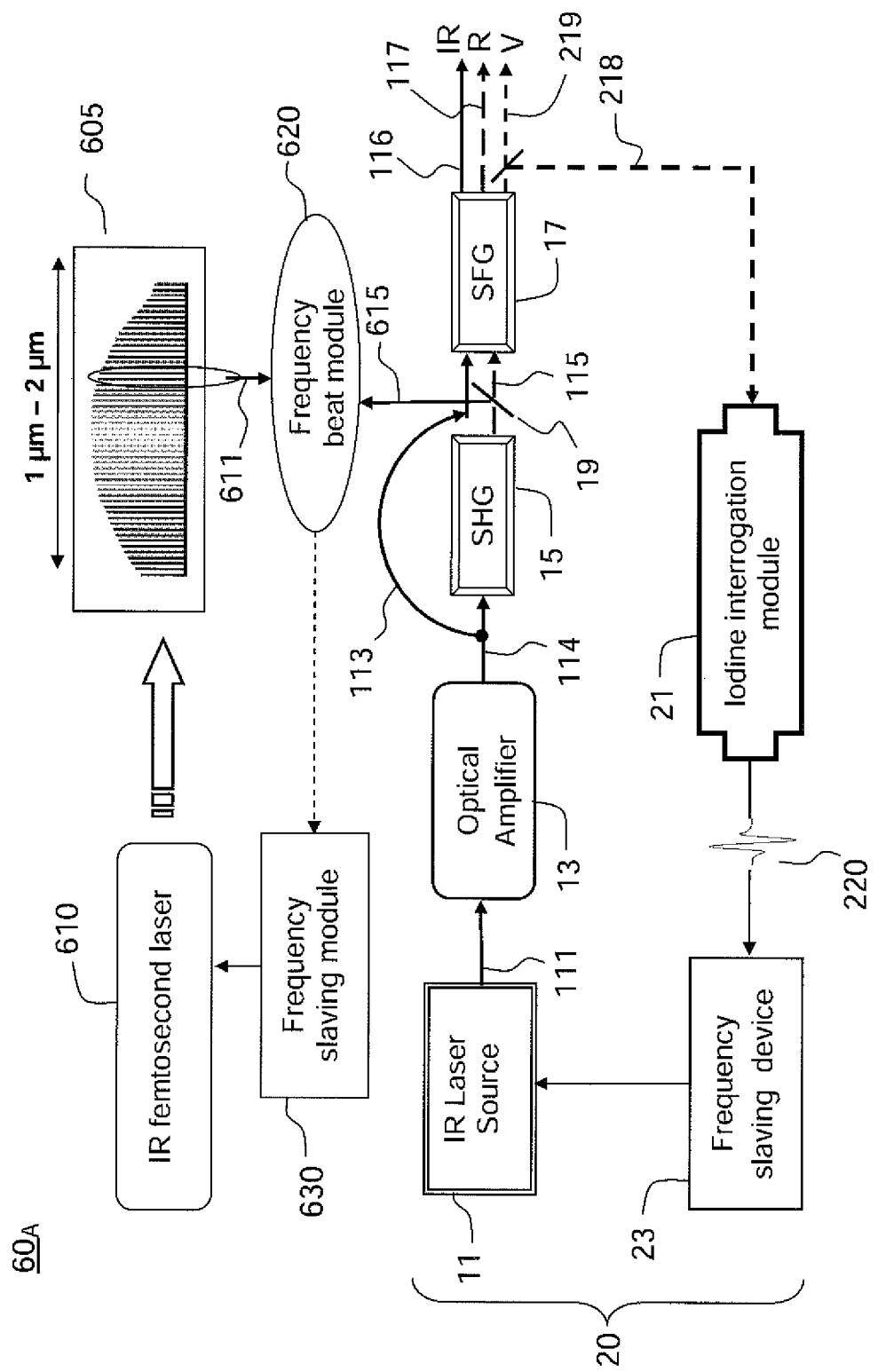
FIGS. 6A and 6B, two examples of generators of stabilized frequency-comb femtosecond pulses, implementing a variant of a generator of infrared and visible beams according to the present description.
Figure 6B:
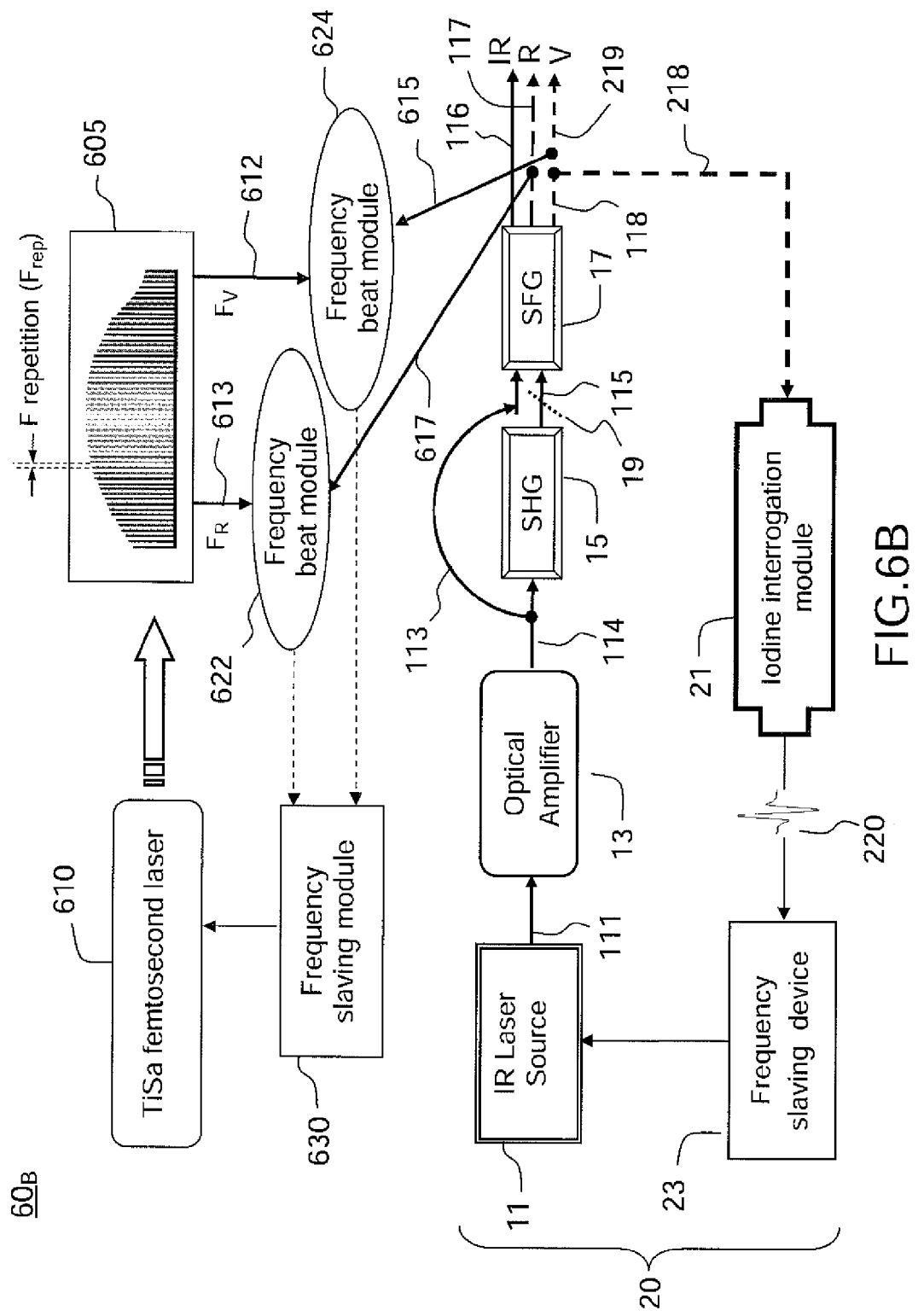

FIGS. 6A and 6B illustrate two examples of generators of femtosecond pulses (respectively $60_A$ and $60_B$) with ultrastable frequency combs, implementing a generator of infrared and visible coherent beams, described in the present description.

The example shown in FIG. 6A illustrates a first example of a pulse generator $60_A$ comprising a femtosecond emission source 610 of Erbium fibered laser type, emitting pulses of spectral band lying between 1 and 2 μm (spectrum 605). In the example of FIG. 6B, the femtosecond emission source is a source in the visible, for example a Ti:Sa laser source. In each of the examples, the pulse generator comprises a generator 20, such as described for example in FIG. 2A, of coherent, continuous, infrared and visible beams. The generator of continuous coherent beams makes it possible to provide an ultrastable frequency reference making it possible to circumvent the frequency drifting of the femtosecond laser, while conferring exactness upon it. Accordingly, the femtosecond pulse generator comprises a module for stabilization using the ultrastable continuous beams generated by the continuous beams generator.

In the example of FIG. 6A, the stabilization module comprises an optical beat module 620, able to produce a beating between a pulse train 611 emitted by the femtosecond laser source and resulting from an optical filtering at a given wavelength, and an infrared beam 615, sampled for example at the output of the doubling crystal 15, forming a first reference laser beam, previously stabilized to iodine. The optical filtering makes it possible to isolate the pulse train's frequency component (or mode) which is closest in terms of frequency to the radiation arising from the generator. Typically, two adjacent frequency components of the frequency comb (corresponding to the repetition rate of the femtosecond laser) are separated by a few hundred MHz ($F_{rep}$, spectrum 605) for a femtosecond laser in the IR (Er type) to a few GHZ for femtosecond lasers in the visible (TiSa type). The optical filtering thus makes it possible to reduce the number of optical components which arrive at the photodiode (module 620), only the frequency component closest to the frequency of the generator being used for the needs of the slaving. The signal arising from the optical beat module is an electrical signal modulated at the difference frequency between the two frequency components (arising respectively from the generator and from the femtosecond laser), typically of the order of a few hundred MHz to a few GHz. More precisely, the optical beat module comprises a fast photodiode (not represented in FIG. 6A) on which the beams 611 and 615 are focused via a suitable lens so as to form interference. The photodiode is for example a detector of the GaAs (gallium arsenide) type if the radiations are situated in the IR domain. The repetition rates of femtosecond lasers vary from a few tens of MHz to a few GHz depending on model or manufacturer; photodiodes having a bandwidth of a few GHz will therefore be useable. The fast photodiode makes it possible to detect a beat signal which is dispatched to a frequency slaving module 630. The slaving module allows the control of the difference in frequencies between the filtered frequency (or mode) and the reference laser beam on the basis of the signal arising from the frequency-beating optical module. In the case of the example of FIG. 6A, a single ultrastable continuous beam is available in the infrared and it is possible to continue to use the self-referencing of the laser 610 for the stabilization of the whole of the frequency comb emitted by the femtosecond laser. Thus, all the lines emitted by the femtosecond laser and corollarily the difference in frequencies between any two lines emitted by this laser are stabilized with the intrinsic performance of the iodine lines. The benefit of this approach therefore resides in the possibility of generating ultrastable frequency differences both in the g-wave domain and in the THz domain. In this manner, if for example the frequency of a powerful laser emitting in the THz domain (quantum cascade diodes for example) is compared with the optical signal arising from the difference in frequencies between two lines of the femtosecond laser, it is possible to confer on the quantum cascade diode the frequency stability arising from the qualities of the iodine lines via the femtosecond laser. This approach can also make it possible to stabilize at the same time several quantum cascade lasers (operating at various wavelengths in the THz domain), to the same reference of iodine, via the same femtosecond laser.

Example 6B shows another exemplary embodiment of a generator of ultrastable femtosecond pulses 60B in the visible and comprising for example a femtosecond emission source 610 of Titanium-Sapphire type, emitting pulses of spectral band lying for example between 515 nm and 772 nm (spectrum 605). In this case, the use of the frequency-doubled radiation (117) and tripled radiation (219) of the coherent beams generator 20 makes it possible to stabilize the femtosecond laser of Ti:Sa type without needing to necessarily widen the spectrum emitted over an octave. Indeed, the optical beating between each of these two radiations and pulse trains emitted by the femtosecond laser respectively at each of the frequencies makes it possible to fully stabilize the spectrum emitted. More precisely, the stabilization module can comprise in this example two optical beat modules 622 and 624 able to generate an optical beating between a first pulse train 613 resulting from an optical filtering in the red and the continuous beam 617 sampled from the beam 117 at the output of the generator of continuous beams on the one hand, and an optical beating between a second pulse train 612 resulting from an optical filtering in the green and the continuous beam 615 sampled from the beam 219 at the output of the generator of continuous beams on the other hand. Each optical beat module comprises for example a fast photodiode, for example a detector of Si (silicon) type. In this example, the frequency slaving module 630 comprises an electronic mixer producing the electrical beating between the electrical beat signals arising from the two beat modules. The slaving module makes it possible to maintain constant the frequency of the signal arising from the electrical beating for the stabilization of the femtosecond source.

Although described through a certain number of detailed exemplary embodiments, the laser emission method and device according to the invention comprise different variants, modifications and enhancements which will be apparent in a manner obvious to a person skilled in the art, it being understood that these different variants, modifications and enhancements form part of the scope, such as defined by the claims which follow.

The invention claimed is:

1. A generator of laser beams in the infrared and in the visible domains, comprising:
   an elementary source for the emission of a continuous laser beam, at a first wavelength in the infrared domain;
   an optical amplifier for the amplification of the continuous laser beam providing an amplified laser beam at the first wavelength;
   a beam splitter allowing to split the amplified laser beam into a first laser beam at the first wavelength and a second laser beam at the first wavelength;
   a nonlinear frequency-doubling crystal, allowing a laser beam at a second wavelength to be generated on the basis of the first laser beam at the first wavelength, wherein the second wavelength is in the visible domain and wherein the first laser beam is directly coupled in the nonlinear frequency-doubling crystal; and
   a nonlinear frequency-sum-generating crystal, allowing a laser beam at a third wavelength to be generated on the basis of the second laser beam at the first wavelength and of the laser beam at the second wavelength, wherein the third wavelength is in the visible domain,
   wherein the second laser beam at the first wavelength is superposed on the laser beam at the second wavelength, the two beams being coupled into the nonlinear frequency-sum-generating crystal, and
   wherein the laser beam at the second wavelength, the laser beam at the third wavelength and the amplified laser beam at the first wavelength exhibit a fixed phase relation.

2. The generator of laser beams according to claim 1, furthermore comprising means for stabilizing the emission frequency of the elementary source on an absorption line of molecular iodine, by using the laser beam generated at the third wavelength.

3. A module for frequency stabilization of the emission lines of a femtosecond laser source, comprising:
   a generator of laser beams according to claim 2;
   a first optical beat module intended to produce an optical beating between a pulse train emitted by the femtosecond laser source, filtered optically at a first wavelength, and a first reference laser beam, generated by the generator of laser beams at a wavelength substantially identical to the wavelength of the filtered pulse train;
   a frequency slaving module allowing the control of the difference in frequencies between the frequencies of the filtered pulse train and of the first reference laser beam on the basis of the signal arising from the optical beat module.

4. The module for frequency stabilization of the emission lines of a femtosecond laser source according to claim 3, comprising:
   a second optical beat module intended to produce an optical beating between a pulse train emitted by the femtosecond laser source, filtered optically at a second given wavelength, and a second reference laser beam, generated by the generator of laser beams at a second wavelength substantially identical to the wavelength of the filtered pulse train,
   the slaving module comprising an electronic mixer making it possible to obtain the difference between the first difference in frequencies between the frequencies of the filtered pulse train at the first wavelength and of the first reference laser beam and the second difference in frequencies between the frequencies of the filtered pulse train at the second wavelength and of the second reference laser beam.

5. An ultrastable femtosecond laser source comprising:
   a femtosecond pulse emission laser source;
   a module for frequency stabilization of the emission lines of the femtosecond pulse emission laser source according to claim 3.

6. The generator of laser beams according to claim 1, furthermore comprising means of control of the optical power of the second laser beam at the first wavelength, at the input of the nonlinear frequency-sum-generating crystal, by using the laser beam generated at the third wavelength.

7. The generator of laser beams according to claim 1, wherein the elementary source allows the emission of a continuous laser beam whose wavelength is contained in one of the S, C or L optical telecommunications bands.

8. The generator of laser beams according to claim 1, being wholly or partially fibered.

9. The generator of laser beams according to claim 1, furthermore comprising frequency-doubling or frequency-sum-generating means for obtaining, on the basis of at least one of the laser beam at the second wavelength or the laser beam at the third wavelength, a phase-coherent-laser beam at a fourth wavelength in the UV domain.

10. A method of generating at laser beams in the infrared and in the visible domains comprising:
    the emission of a continuous laser beam, at a first wavelength in the infrared domain;
    the amplification of the continuous laser beam providing an amplified laser beam at the first wavelength;
    the splitting of the amplified laser beam into a first laser beam at the first wavelength and a second laser beam at the first wavelength;
    the generation, on the basis of the first laser beam at the first wavelength, by means of a nonlinear frequency-doubling crystal, of a laser beam at a second wavelength, wherein the second wavelength is in the visible domain and wherein the first laser beam is directly coupled in the nonlinear frequency-doubling crystal; and
    the generation, on the basis of the second laser beam at the first wavelength and of the laser beam at the second wavelength, by means of a nonlinear frequency-sum-generating crystal, of a laser beam at a third wavelength, wherein the third wavelength is in the visible domain,
    wherein the second laser beam at the first wavelength is superposed on the laser beam at the second wavelength, the two beams being coupled into the nonlinear frequency-sum-generating crystal, and
    wherein the laser beam at the second wavelength, the laser beam at the third wavelength and the amplified laser beam at the first wavelength exhibit a fixed phase relation.

11. The method of generating laser beams according to claim 10, furthermore comprising the stabilization of the emission frequency of the elementary source on an absorption line of molecular iodine, by using the laser beam generated at the third wavelength.

12. The method of generating laser beams according to claim 11, furthermore comprising the modulation of the second laser beam at the first wavelength incident in the nonlinear frequency-sum-generating crystal, as a function of a coding signal.

13. A method of frequency stabilization of the emission lines of a femtosecond laser source comprising:
- the optical beating between a pulse train emitted by the femtosecond laser source, filtered optically at a first wavelength, and a first reference laser beam, generated according to the described method according to claim 11, at a wavelength substantially identical to the wavelength of the filtered pulse train;
- the control of the difference in frequencies between the frequencies of the filtered pulse train and of the first reference laser beam on the basis of the signal arising from the optical beat module.

14. The method of frequency stabilization of the emission lines of a femtosecond laser source according to claim 13 comprising:
- the optical beating between a pulse train emitted by the femtosecond laser source, filtered optically at a second wavelength, and a second reference laser beam at a second wavelength substantially identical to the wavelength of the filtered pulse train;
- the control of the difference between the first difference in frequencies between the frequencies of the filtered pulse train at the first wavelength and of the first reference laser beam and the second difference in frequencies between the frequencies of the filtered pulse train at the second wavelength and the second reference laser beam.

15. The method of generating laser beams according to claim 10, furthermore comprising the control of the optical power of the second laser beam at the first wavelength, at the input of the nonlinear frequency-sum-generating crystal, by using the laser beam generated at the third wavelength.

* * * * *